US009922655B2

(12) United States Patent
Hardee et al.

(10) Patent No.: US 9,922,655 B2
(45) Date of Patent: Mar. 20, 2018

(54) SYSTEM, METHOD, AND RECORDING MEDIUM FOR CONTROLLING DIALOGUE INTERRUPTIONS BY A SPEECH OUTPUT DEVICE

(71) Applicant: International Business Machines Corporation, Armonk, NY (US)

(72) Inventors: Christopher J. Hardee, Raleigh, NC (US); Steven Robert Joroff, Tokyo (JP); Pamela Ann Nesbitt, Ridgefield, CT (US); Scott Edward Schneider, Rolesville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/168,297

(22) Filed: May 31, 2016

(65) Prior Publication Data

US 2017/0345429 A1  Nov. 30, 2017

(51) Int. Cl.
*G10L 17/00* (2013.01)
*G10L 17/06* (2013.01)
*G10L 17/26* (2013.01)
*G10L 25/93* (2013.01)
*G10L 25/84* (2013.01)
*G06F 3/16* (2006.01)

(52) U.S. Cl.
CPC .............. *G10L 17/06* (2013.01); *G06F 3/167* (2013.01); *G10L 17/26* (2013.01); *G10L 25/84* (2013.01); *G10L 25/93* (2013.01)

(58) Field of Classification Search
CPC ......... G10L 15/22; G10L 15/05; G10L 15/26; G10L 25/51; G10L 25/78
USPC ......................................................... 704/248
See application file for complete search history.

(56) References Cited

U.S. PATENT DOCUMENTS

| 2002/0133355 | A1 | 9/2002 | Ross et al. |
| 2005/0267759 | A1* | 12/2005 | Jeschke ............... B60R 16/0373 704/270 |
| 2006/0200350 | A1* | 9/2006 | Attwater ................. G10L 15/08 704/251 |
| 2008/0077310 | A1 | 3/2008 | Murlidar et al. |
| 2014/0074483 | A1 | 3/2014 | Van Os |
| 2014/0278444 | A1* | 9/2014 | Larson ............... H04M 1/72522 704/275 |

(Continued)

*Primary Examiner* — Paras D Shah
*Assistant Examiner* — Yi-Sheng Wang
(74) *Attorney, Agent, or Firm* — Yeen Tham, Esq.; McGinn IP Law Group, PLLC

(57) ABSTRACT

A computer speech output control method, system, and non-transitory computer readable medium, include a computer speech output control system, including a computer speech output unit configured to output a computer speech, a human speech monitoring circuit configured to determine whether a human conversation is occurring, an interruption priority setting circuit configured to set a priority setting for when the human conversation can be interrupted by the computer speech, and an interruption determining circuit configured to determine whether to cause the computer speech output unit to output the computer speech based on the priority setting and a status of the human conversation.

18 Claims, 5 Drawing Sheets

(56) References Cited

U.S. PATENT DOCUMENTS

2015/0302867 A1* 10/2015 Tomlin .................... G10L 25/78
704/270
2015/0302869 A1* 10/2015 Tomlin .................... G10L 25/78
704/246

* cited by examiner

SYSTEM, METHOD, AND RECORDING MEDIUM FOR CONTROLLING DIALOGUE INTERRUPTIONS BY A SPEECH OUTPUT DEVICE

BACKGROUND

The present invention relates generally to a dialogue interruption control system, and more particularly, but not by way of limitation, to a system controlling interruption of human conversations by a machine-generated speech output.

It is becoming an increasing annoyance when computer speech (i.e., speech dialogue) generated from, for example, navigation guidance applications or smartphone assistants such as Google Now™ or Siri™ interrupt a conversation of users.

Conventional techniques to limit interrupts consider activity by the user that is detectable by the system such as an incoming phone call or interrupting other computer speech.

That is, there is a technical problem in the conventional techniques in that the conventional techniques do not consider controlling computer speech output not to interrupt human conversations.

SUMMARY

In view of the technical problem in the art, the inventors have considered the technical solution to the technical problem in which a more efficient computer can listen for the absence of a human speech conversation or at least natural pauses by the user before the computer speech is output that can be adjusted based on an urgency of the computer speech.

In an exemplary embodiment, the present invention can provide a computer speech output control system, including a computer speech output unit configured to output a computer speech, a human speech monitoring circuit configured to determine whether a human conversation is occurring, an interruption priority setting circuit configured to set a priority setting for when the human conversation can be interrupted by the computer speech, and an interruption determining circuit configured to determine whether to cause the computer speech output unit to output the computer speech based on the interruption priority setting and a status of the human conversation.

Further, in another exemplary embodiment, the present invention can provide a computer speech output control method, including detecting if a human conversation is occurring, setting a priority setting for when the human conversation can be interrupted by a computer speech, and determining whether to cause an output of the computer speech based on the interruption priority setting and a status of the human conversation.

Even further, in another exemplary embodiment, the present invention can provide a non-transitory computer-readable recording medium recording a computer speech output control program, the program causing a computer to perform: detecting if a human conversation is occurring, setting a priority setting for when the human conversation can be interrupted by a computer speech, and determining whether to cause an output of the computer speech based on the interruption priority setting and a status of the human conversation.

There has thus been outlined, rather broadly, an embodiment of the invention in order that the detailed description thereof herein may be better understood, and in order that the present contribution to the art may be better appreciated.

There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
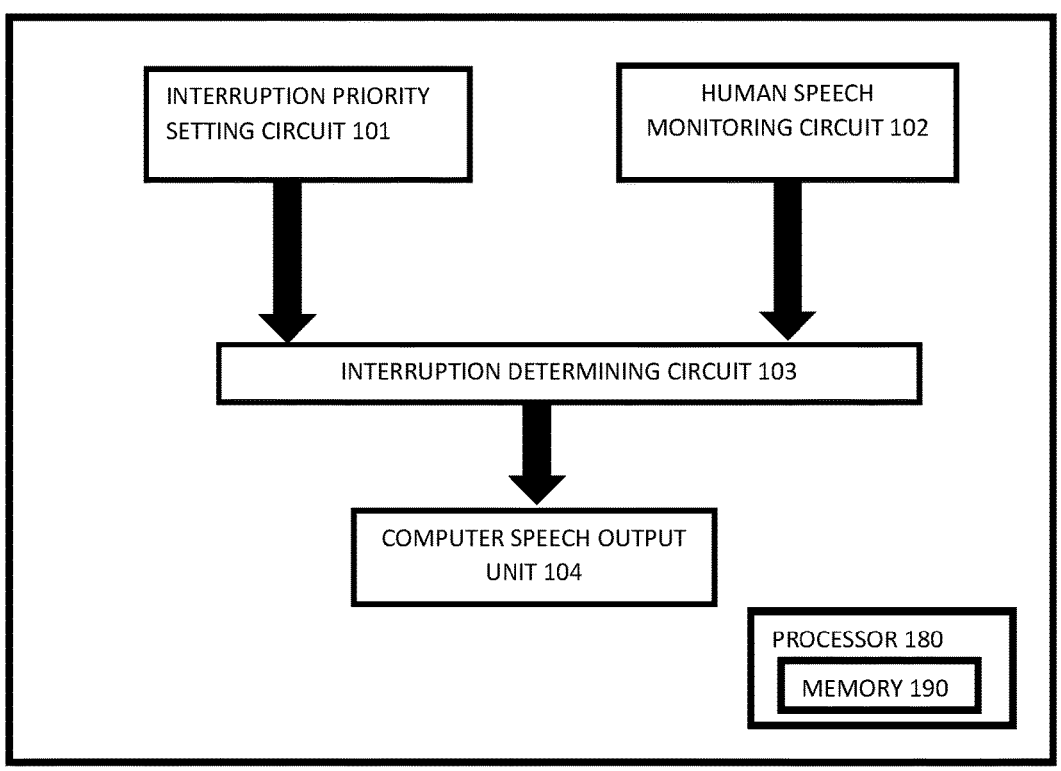
FIG. 1 exemplarily shows a block diagram illustrating a configuration of a computer speech output control system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the computer speech output control system 100 includes an interruption priority setting circuit 101, a human speech monitoring circuit 102, an interruption determining circuit 103, and a computer speech output unit 104. The computer speech output control system 100 includes a processor 180 and a memory 190, with the memory 190 storing instructions to cause the processor 180 to execute each circuit of computer speech output control system 100. The processor and memory may be physical hardware components, or a combination of hardware and software components.

Although the computer speech output control system 100 includes various circuits, it should be noted that a computer speech output control system can include modules in which the memory 190 stores instructions to cause the processor 180 to execute each module of computer speech output control system 100.

Also, each circuit can be a stand-alone device, unit, module, etc. that can be interconnected to cooperatively produce a transformation to a result.

With the use of these various circuits, the computer speech output control system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
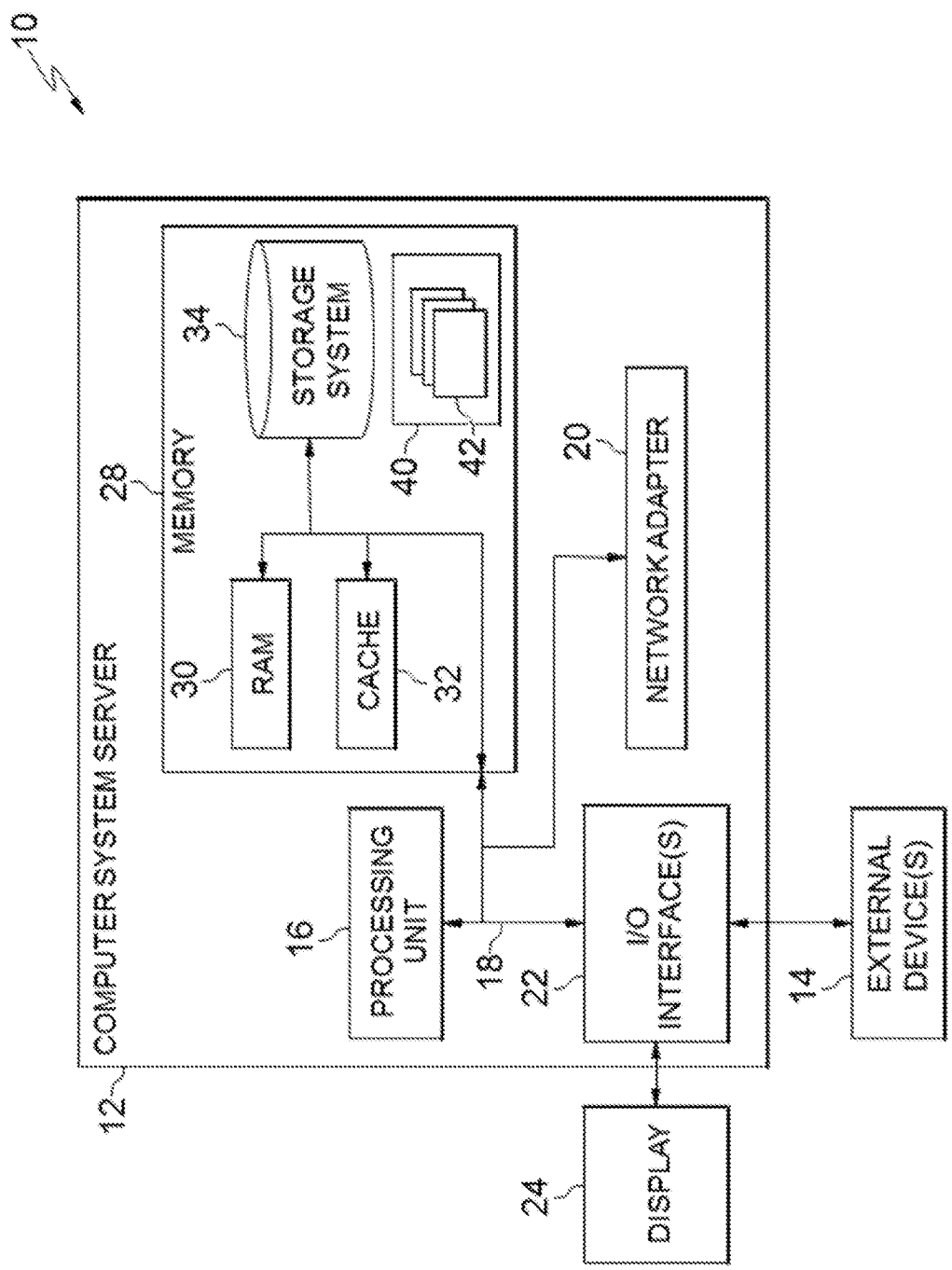
FIG. 3 depicts a cloud computing node 10 according to an exemplary embodiment of the present invention.
Figure 4:
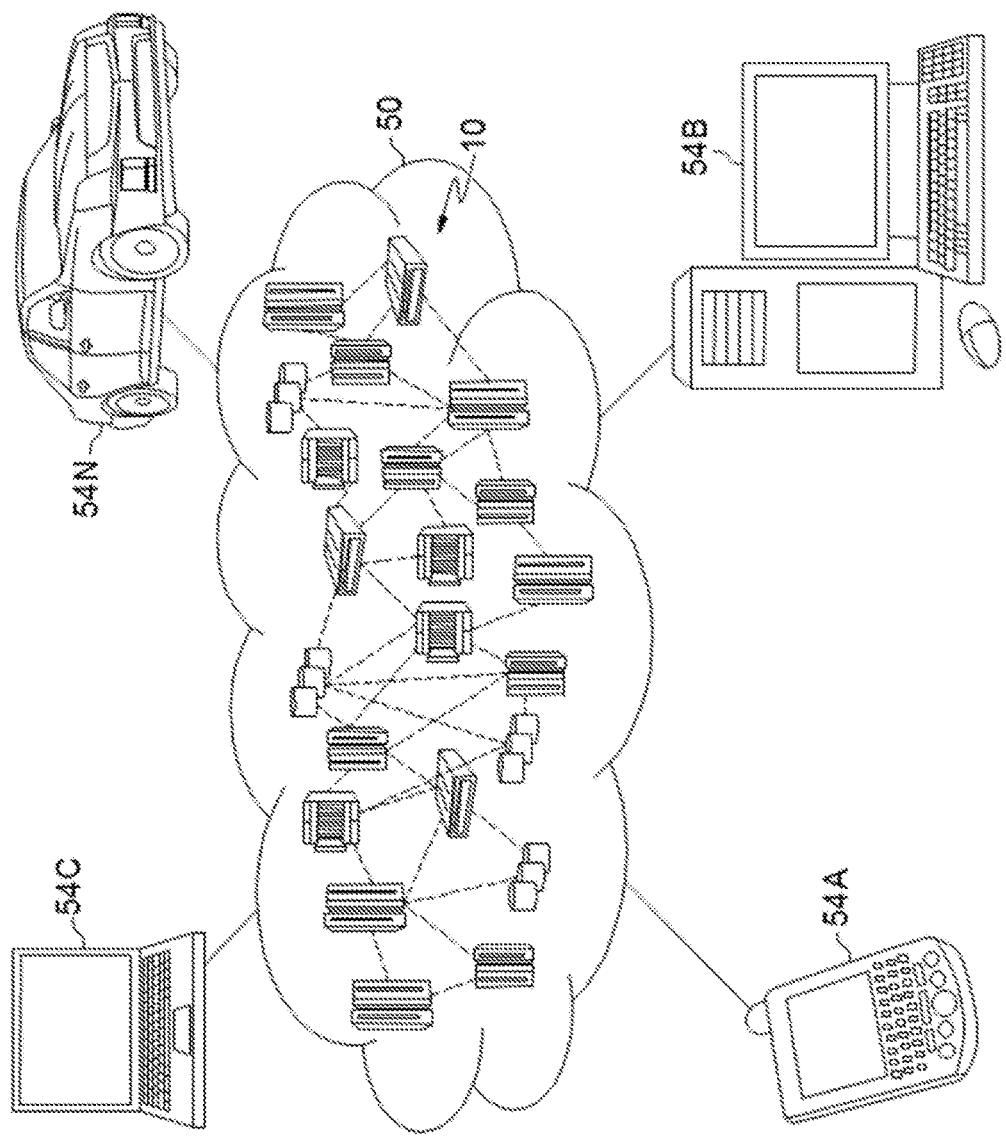
FIG. 4 depicts a cloud computing environment 50 according to another exemplary embodiment of the present invention.
Figure 5:
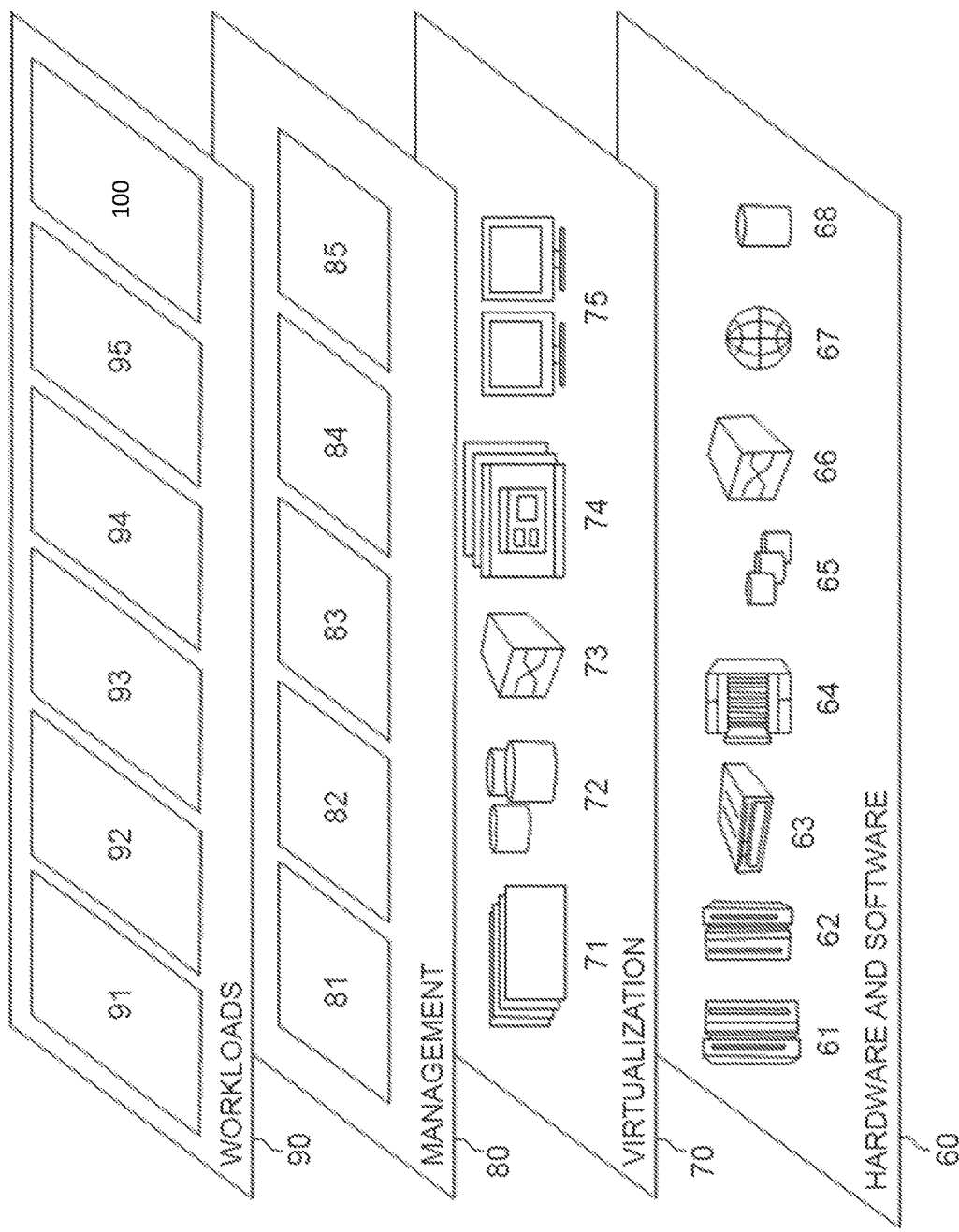
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the computer speech output control system 100 (FIG. 5), it is noted that the present invention can be implemented outside of the cloud environment.

Referring to FIG. 1, the interruption priority setting circuit 101 sets a priority for when the human conversation can be interrupted by computer speech based on a user input. However, by default, content that the computer speech output unit (i.e., the computer system generating the computer speech) output will have a default interruption priority of "medium". Also, the interruption priority setting circuit 101 can automatically set priority levels for computer speech content (i.e., type of content that is generating the computer speech) that runs the spectrum from "low" to "high". For example, messages read to a user on an in-car stereo receiver coupled to a smartphone's text message receipt subsystem may be automatically set to a "low" priority for interruption while navigation guidance computer speech about to tell the driver they are going to miss their next right turn up ahead, may be coded as "high" priority for interruption.

Also, the interruption priority setting circuit 101 can include priority settings of which computer speech to output first. For example, the user can input a message priority associated with the classification of the message. For example, if a text message is being read to a user and an immediate turn is coming up, the interruption priority setting circuit 101 can be configured such that the immediate turn will be prioritized to interrupt the text message being read.

The user can set a desired "conditional interruption" preferences by inputting to the interruption priority setting circuit 101 how and when, if ever, the user would like to be interrupted. Conditional interruption preferences can include, for example, users of a conversation to never interrupt (i.e., if the conversation is between a user and a client, a user and their boss, etc.), acceptable users to always interrupt (i.e., if conversation is between a user and their children or spouse), an urgency timing of a message (i.e., always interrupt if the navigational message relates to a turn within a predetermined time or interrupt if the smartphone assistant is reminding of an urgent meeting), a proximity of the users to the system (i.e., if the conversation being monitored by the human speech monitoring circuit 102 is occurring in a back seat of a vehicle or in a room and a smartphone is left at idle in a different room), etc. Also, a condition can be created based on the user being the owner of the device that outputs the computer speech such that specific conditional interruption preferences can be set up only if the owner is engaged in the human-to-human conversation such that other people passing by or near the system 100 will not cause the system to ever output computer speech (i.e., in a crowded room, a bus, an airplane, etc.).

The human speech monitoring circuit 102 monitors human speech that is occurring between at least two humans. That is, the human speech monitoring circuit 102 determines if the human speech that is detected is human-to-human speech or human-to-computer speech (i.e., voice activation or voice control).

Also, the human speech monitoring circuit 102 identifies the particular users speaking such that interruption preferences, speech cadence (i.e., predicting when a pause in the user's speech pattern will occur), a decay in conversation (i.e., determine if the conversation is no longer relevant or is nearing an end), conversational patterns, or the like can be learned.

Further, the human speech monitoring circuit 102 can "learn" speech of a repetitive user, and its pattern, thereby to identify the same.

Therefore, the system can be trained to recognize and differentiate between various human speakers and trigger different "conditional interruption" settings of the interruption priority setting circuit 101 for each recognized speaker or conversation group as a whole. Also, the human speech monitoring circuit 102 can learn to distinguish anticipated user speech from background noise based on the previously identified or expected user speech. For example, if a first user is speaking, one interruption setting is used, whereas if a second user is speaking, a second setting is used. Or, if two particular speakers are having a conversation, there can be rules to determine which preference to use, most interruptible or least interruptible, or pair or tuple qualified speaker preferences could be configured as well in association with identifies the particular speaker by the human speech monitoring circuit 102. Further, the human speech monitoring circuit 102 can distinguish between speech and extraneous human sounds such as coughing, sneezing, crying, etc.

The human speech monitoring circuit 102 can further detect a proximity of the users engaged in the human-to-human speech with respect to the system 100. The detection can be based on directional microphones, a decibel level of the speech received by the human speech monitoring circuit 102, or the like.

The interruption determining circuit 103 receives interruption priority settings from the interruption priority setting circuit 101 and the human speech conversation from the human speech monitoring circuit 102 and determines an allowable time to cause the computer speech output unit 104 to output the computer speech based on the interruption priority settings and the human-to-human speech.

For example, the interruption determining circuit 103 can determine an instantaneous generation of the computer speech by the computer speech output unit 104 such that the computer speech directly interrupts any human-to-human conversation within a proximity of the system 100 if the interruption priority setting is "high" or the user input that the particular users engaged in the human-to-human conversation can always be interrupted by computer speech.

Further, the interruption determining circuit 103 can determine not to directly interrupt the human-to-human speech and instead wait for pauses in the human-to-human conversation (i.e., delays in the conversation) as detected/predicted by the human speech monitoring circuit 102 and cause the computer speech output unit 104 to interject in the pauses with the computer speech if the computer speech message has a lower priority setting.

Also, the interruption determining circuit 103 can cause the computer speech generating unit 104 to output the computer speech if the human speech monitoring circuit 102 determines a decay of the overall human-to-human conversation, until there is some time period of lack of or decayed conversation.

Moreover, the interruption determining circuit 103 can cause the computer speech output unit 104 to output the computer speech according to a periodic schedule in which the interruption determining circuit 103 collects all computer speech to be output in between intervals of generation. Thus, when the time in the periodic schedule occurs to deliver the speech payload(s), the interruption determining circuit 103 can determine an allowable time for each of the computer speech to be delivered by the computer speech output unit 104 based on the above three interruption techniques. Thus, periodic interruptions allows some guaranteed non-interruption time, even when there is no human conversation present.

Because of the above suppression of computer speech by the interruption determining circuit 103, the computer speech output unit 104 may change the computer speech content when it has permission to deliver the computer speech for computer speech that is time-sensitive, such as in a navigation guidance. If the computer speech is not reconsidered by, for example, the navigation system, it may be out-of-date. Based on the suppression of the computer speech by the interruption determining circuit 103, the computer speech output unit 104 can decide not to output the computer speech altogether if it is no longer relevant.

For example, if a navigation system repeats the same guidance, as a turn gets closer for instance, the navigation system can choose to make the first message a medium to high priority and the second reminder message a longer priority such as low to medium (i.e., via the interruption priority setting circuit 101). Therefore, the reminder message may not be spoken if a conversation exists and the user preferences are set accordingly. Or, the first message has a lower priority but the message that indicates one is about to miss the next turn is a high priority. In this case, the high priority message, in light of the user preferences, could come through and interrupt proximate human conversations immediately.

Further, if the interruption determining circuit 103 determines not to interrupt the human-to-human conversation, instead of the computer speech output unit 104 generating the computer speech since a human conservation is causing the interruption determining circuit 103 not to interrupt the conversation, the computer speech can be transformed to, for example, vibrations in a steering wheel (e.g., a vibratory signal) to signify the driver must turn, an unobtrusive tone or alarm, or it could be displayed on the heads-up windshield display or the like (e.g., a visual signal), or heating (or cooling) the users seat, headrest, armrest, or steering wheel to alert the user in a fashion that is less distracting to an on-going conversation while still generating computer "speech" to deliver the message.

Figure 2:
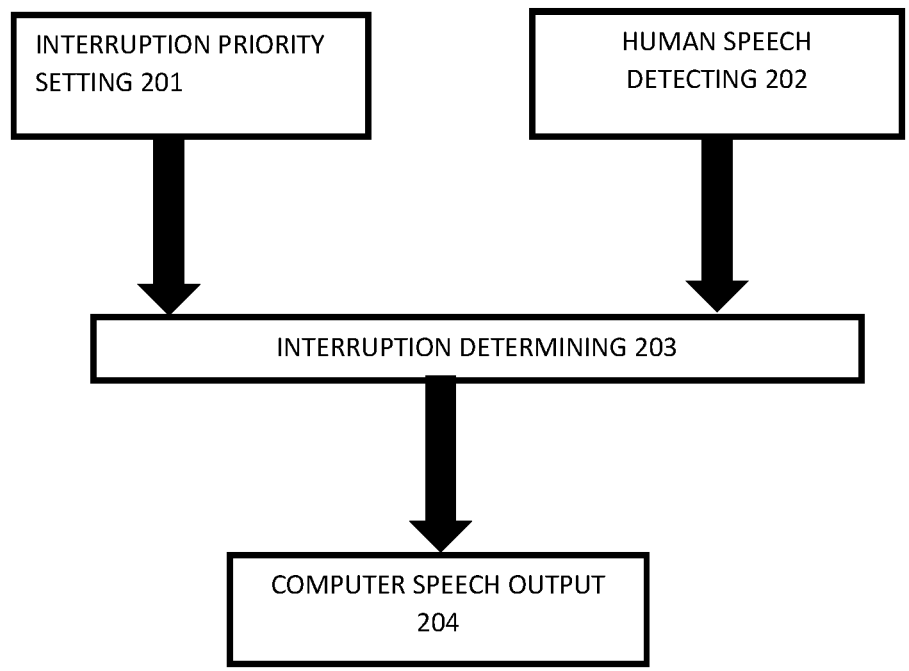
FIG. 2 exemplarily shows a high level flow chart for a computer speech output control method 200.

FIG. 2 shows a high level flow chart for a method 200 of computer speech output control.

Step 201 sets a priority for when the human conversation can be interrupted by computer speech based on a user input or by a default setting.

Step 202 monitors human speech that is occurring between at least two humans. That is, Step 202 determines if the human speech that is detected is human-to-human speech or human-to-computer speech (i.e., voice activation or voice control).

Step 203 receives interruption priority settings from Step 201 and the human speech conversation from Step 202 and determines an allowable time to cause Step 204 to output the computer speech based on the interruption priority settings and the human-to-human speech.

Step 204 outputs computer speech at the allowable time based on the determination by Step 203.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG.

7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the computer speech output control system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer speech output control system, comprising:
a computer speech output unit configured to output a computer speech;
a human speech monitoring circuit configured to determine whether a human conversation is occurring;
an interruption priority setting circuit configured to set a priority setting for when the human conversation can be interrupted by the computer speech; and
an interruption determining circuit configured to determine whether to cause the computer speech output unit to output the computer speech based on the priority setting and a status of the human conversation,
wherein the human conversation comprises human-to-human speech,
wherein the human-to-human speech includes ambient speech not directed to an electronic device,
wherein the human-to-human speech comprises speech between two humans that is not via the electronic device,
wherein the interruption determining circuit sets an allowable time for interruption as a pause time in the human conversation, and causes the computer speech output unit to interject into the human conversation with the computer speech during the pause time, wherein the pause time is determined from pauses detected in the human-human speech.

2. The system of claim 1, wherein the interruption determining circuit determines an allowable time for causing the computer speech output unit to output the computer speech based on the priority setting and the status of the human conversation.

3. The system of claim 2, wherein the interruption determining circuit determines the allowable time as instantaneous if the priority-' setting received from the interruption priority setting circuit for the computer speech is greater than a predetermined threshold value.

4. The system of claim 2, wherein the interruption determining circuit sets the allowable time for interruption as a pause time in the human conversation.

5. The system of claim 2, wherein the interruption determining circuit sets the allowable time for interruption as a pause time in the human conversation if the priority-setting received from the interruption priority setting circuit for the computer speech is less than a predetermined threshold value.

6. The system of claim 2, wherein the interruption determining circuit sets the allowable time for interruption as a time when the human speech monitoring circuit detects a decay in the human conversation.

7. The system of claim 2, wherein the priority setting includes a periodic schedule for the computers speech output unit to output the computer speech during the allowable time after a generation time, of the periodic schedule occurs.

8. The system of claim 2, wherein the computer speech output unit suppresses the computer speech if a relevancy factor of the computer speech is less than a predetermined threshold value when the interruption determining circuit determines the allowable time to output the computer speech.

9. The system of claim 2, wherein the priority setting includes a non-generation setting that causes the computer speech output unit to output a visual version of the computer speech instead of an audible version of the computer speech at the allowable time.

10. The system of claim 2, wherein the interruption determining circuit determines the allowable time as instantaneous if the priority setting received from the interruption priority setting circuit for the computer speech is greater than a predetermined threshold value,
wherein the interruption determining circuit sets the allowable time for interruption as a pause time in the human conversation,
wherein the interruption determining circuit sets the allowable lime for interruption as a time when the human speech monitoring circuit detects a decay in the human conversation, and
wherein the priority setting includes a periodic schedule for the computers speech output unit to output the computer speech dining the allowable time after a generation time of the periodic schedule occurs.

11. The system of claim 1, wherein the human speech monitoring circuit is further configured to identify whether a primary user of the system is engaged in the human conversation, and
wherein the interruption priority setting circuit includes a primary user priority setting in which a specific conditional interruption preference is set up based on tire primary user being engaged in the human conversation.

12. The system of claim 1, wherein the human speech monitoring circuit further detects a proximity' of humans engaged in the human conversation to the system.

13. The system of claim 1, wherein the human speech monitoring circuit identifies in the human conversation at least one of:
a specific user speaking:
a speech cadence of a user;
a decay in the human conversation; and a conversational pattern of the human conversation.

14. The system of claim 1, wherein the priority setting comprises a plurality? of importance levels corresponding to a plurality of types of computer speech content, the interruption determining circuit determining the allowable interruption time based on an importance level for the computer speech content.

15. The system of claim 1, wherein the priority setting comprises a plurality of importance levels corresponding to a plurality of types of computer speech content, a user inputting each of the plurality of importance levels according to the user preference.

16. The system of claim 1, wherein the human-to-human speech is directly between two humans without any intermediary".

17. A computer speech output control method, comprising:
detecting if a human conversation is occurring;
setting a priority setting for when the human conversation can be interrupted by a computer speech; and
determining whether to cause an output of the computer speech based on the priority setting and a status of the human conversation;
wherein the human conversation comprises human-to-human speech,
wherein the human-to-human speech includes ambient speech not directed to an electronic device,
wherein the human-to-human speech comprises speech between two humans that is not via the electronic device, and
the method further comprising:
wherein setting an allowable time for interruption as a pause time in the human conversation, and causes the computer speech output unit to interject into the human conversation with the computer speech during the pause time, wherein the pause time is determined from pauses detected in the human-human speech.

18. A non-transitory computer-readable recording medium recording a computer speech output control program, the program causing a computer to perform:
   detecting if a human conversation is occurring;
   setting a priority setting for when the human conversation can be interrupted by a computer speech; and
   determining whether to cause an output of the computer speech based on the priority setting and a status of the human conversation,
   wherein the human conversation comprises human-to-human speech,
   wherein the human-to-human speech includes ambient speech not directed to an electronic device, and
   wherein the human-to-human speech comprises speech between two humans that is not via the electronic device, and
   further comprising:
   wherein setting an allowable time for interruption as a pause time in the human conversation, and causes the computer speech output unit to interject into the human conversation with the computer speech during the pause time, wherein the pause time is determined from pauses detected in the human-human speech.

* * * * *